Oct. 20, 1931.   J. N. SCISM   1,827,914
SEALING-OFF MACHINE FOR GLASS OBJECTS
Filed March 28, 1928   3 Sheets-Sheet 1
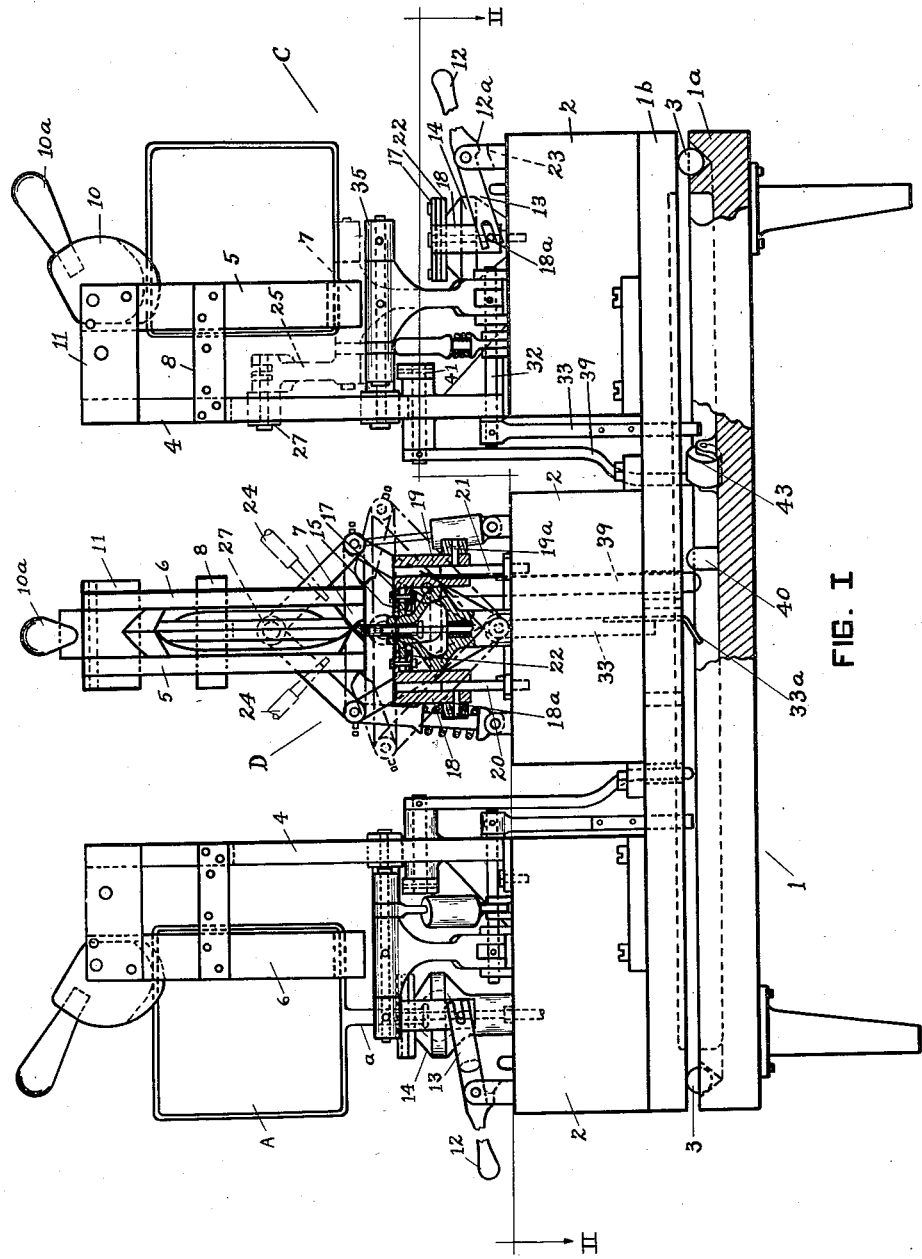
FIG. I
INVENTOR
JOHN N. SCISM
by *William B. Wharton*
his attorney.

Oct. 20, 1931.    J. N. SCISM    1,827,914
SEALING-OFF MACHINE FOR GLASS OBJECTS
Filed March 28, 1928    3 Sheets-Sheet 2
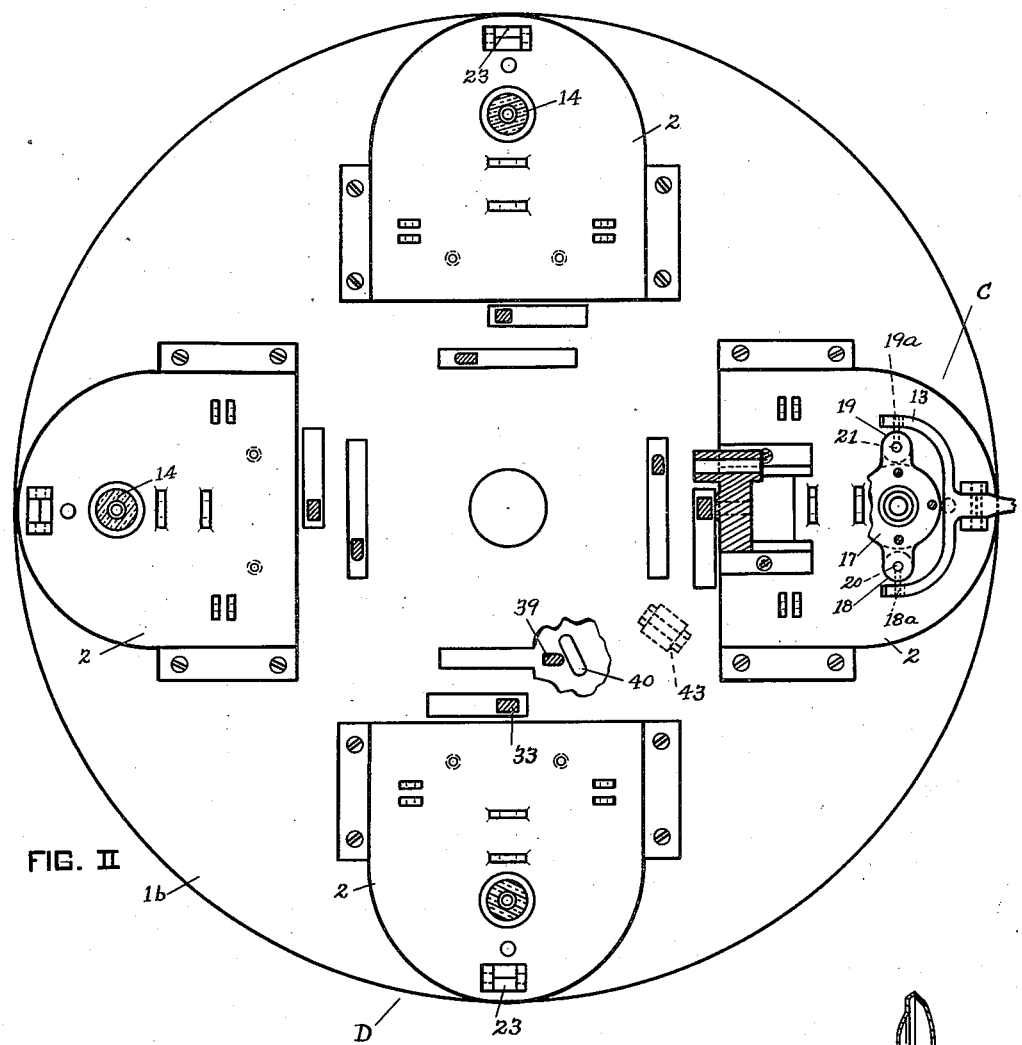
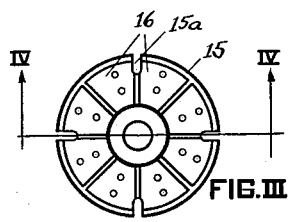
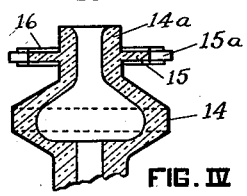
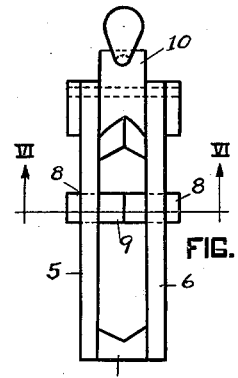
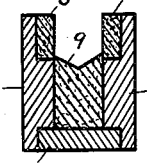
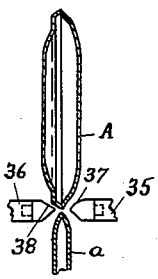
INVENTOR
JOHN N. SCISM.
by William B. Wharton
his attorney.

Oct. 20, 1931.  J. N. SCISM  1,827,914
SEALING-OFF MACHINE FOR GLASS OBJECTS
Filed March 28, 1928   3 Sheets-Sheet 3
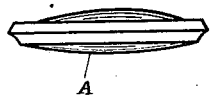
FIG. XI
FIG. VIII 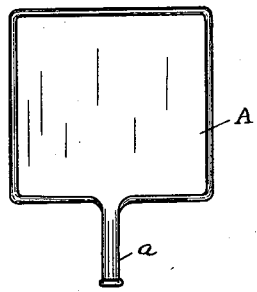 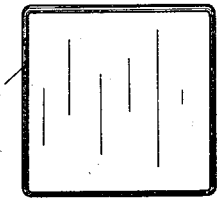 FIG. IX
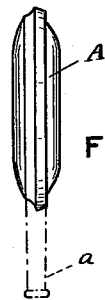
FIG. X
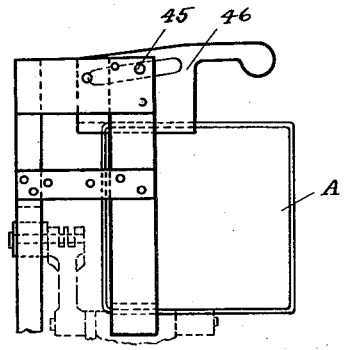
FIG. XIII
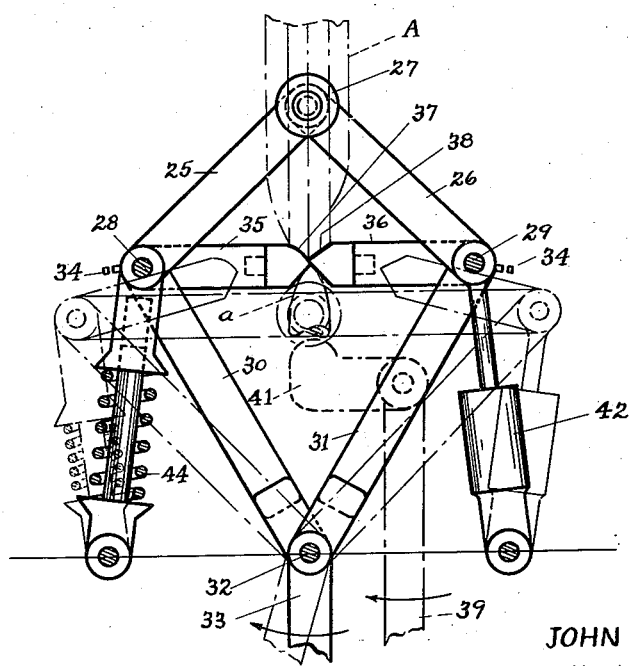
FIG. XII
INVENTOR
JOHN N. SCISM
by William B. Wharton
his attorney.

Patented Oct. 20, 1931

1,827,914

UNITED STATES PATENT OFFICE

JOHN N. SCISM, OF WILKINSBURG, PENNSYLVANIA

SEALING-OFF MACHINE FOR GLASS OBJECTS

Application filed March 28, 1928. Serial No. 265,361.

This invention relates to a device for exhausting and sealing off hollow glass objects.

It is well known in the art that hollow glass objects may be exhausted by connections to suitable exhausting means. If desirable, the air may be rarefied in the object and a gas of different properties introduced to replace the air which has been removed. In either event the glass object is usually formed with an extenuated portion of relatively small cross section for the purpose of presenting a suitable connection between the interior of the said glass object and the exhausting means. This extenuated portion, hereinafter referred to as the neck of the object, must be closed or sealed off after the determination of the desired gaseous content of the said hollow glass object.

The particular place where the neck is sealed off varies for different kinds of objects. In many instances the shape of the resulting sealed region is of importance. That is, the formation of the closed and sealed neck should resemble in conformation certain other features of the glass object. This is of prime importance in the particular glass body for which the device of this invention was evolved.

It is within general knowledge that double paned window glasses have superior heat insulating effect over single panes. They have, however, never been commonly employed in window installations because of the prohibitive cost of manufacture. In order to permit the aforesaid knowledge to be reduced to practice the applicant has conceived a peculiarly shaped hollow glass object, which, due to its said shape, may be manufactured very economically in automatic glass blowing machines, and which will serve as a double walled window pane.

Before the usual neck, remaining on the object after the blowing and forming operation, has been removed and sealed, it is possible to remove the internal air of the object and obtain a more efficient heat insulation. As said above, the special shape of the object which permits it to be generated in modern bottle blowing machines is of great importance. Of equal importance, however, is the means for exhausting and sealing off the glass panes.

The object of this invention is to provide means for exhausting and sealing off glass objects of the type referred to herein.

Another object of the invention is to provide means for automatically exhausting the air from hollow glass bodies, and means for substituting another gas in the rarefied interior of the said glass body, and further means for sealing off the neck to conform with the periphery of the said body.

In the accompanying drawings Figure I is a side elevation of the machine for exhausting and sealing off glass objects, certain elements of the machine being shown in section; Figure II is a view of the machine bed taken on the line II—II of Fig. I; Figure III is a plan view of a neck engaging nipple as used on the machine; Figure IV is a sectional view of the same taken on the line IV—IV of Fig. III; Figure V is a detail view of the retaining means for the glass objects; Figure VI is a sectional view taken on the line VI—VI of Figure V; Figure VII is a central vertical section through the glass body showing how the sealing off dies remove the neck of the body; Figure VIII is a plan view of the blown glass body ready for its introduction to the machine of the present invention; Figure IX is a similar view of the same, after it has passed through the said machine and is exhausted and sealed off; Figure X is a side elevation of the finished double walled pane; Figure XI is a top edge view of the same; Figure XII is an enlarged detailed view of the sealing off dies and their immediate operative elements; and Figure XIII is a side elevation of a modified form of clamping means for use in the glass object retaining means.

The reference numeral 1 denotes the bed of the machine which may have equally spaced adjacent the outer edge thereof any desirable number of operating units mounted on bases 2. The bed 1 of the machine is composed of two portions. The lower portion 1a is positioned on legs, or on any suitable foundation, and has therein a race of ball bearings 3. Resting on the said bearings 3 is the upper bed portion 1b. This permits the portion 1b to be rotated, either by hand or by mechanical means with relative ease. On the several bases 2 are mounted the operating elements proper, which being fixed to the bases 2, rotate with the bed portion 1b.

As the operating elements on each base 2 are similar, a description of any one unit will serve for all. Because of the peculiar shape of the glass body it was found necessary to provide a special clamp in which to hold the said body with sufficient rigidity. The vertical standard 4, bolted to the base 2, affords the mounting means for the clamp arrangement shown in detail in Figure V. The side members 5 and 6 are composed of soft material, such as asbestos board and at their lower extremities is fixed the V shaped seat 7. Mounted between the metal cross supports 8 and the standard 4 is a similar V shaped backing piece 9. Both the seat 7 and the backing 9 are preferably composed of compressed asbestos, although soft wood might be employed for the backing 9 as it is removed an appreciable distance from the heating elements, described hereinafter, that are brought to play on the neck of the glass body. Between the upper ends of the members 5 and 6 is eccentrically pivoted the clamping shoe 10. As shown in Figure V, the lower edge of this shoe is of a V shape similar to the glass contacting faces of the members 7 and 9. The vertical members 5 and 6 are further supported in the bifurcated extension 11 of the standard 4.

The operator may stand to the right of the machine as shown in Figure I. A blown glass body A, as shown in Figure VIII, is placed on edge, with the neck a pointing downwardly, between the vertical members 5 and 6. The handle 10a of the clamping shoe 10 is then pulled downwardly. This firmly fixes the body A in the machine. Next the handle 12 of the yoke lever 13 is pressed to the position it is shown in at the left of Figure I. This action serves to raise the rubber nipple 14 to engage a sufficient length of the neck a.

Figures III and IV show in detail the novel structure of the nipple 14. The flange 15 spreading from the upper neck engaging portion 14a has a plurality of metal plates 16 riveted to its upper and lower surfaces. These plates 16 are used to give rigidity to the flange 15 which is formed of the relatively soft rubber of the body portion of the nipple. To properly guide the movement of the said nipple as it is raised to engage the neck a, it is bolted to the plate member 17. The member 17 has two legs 18 and 19 which are machined to slide on the vertical pins 20 and 21. As shown in section in Figure I the flange 15 rests between the upper plate portion of the member 17 and the large washer 22. Four bolts pass from the washer 22 through the notches 15a of the flange 15 and through the member 17 and afford a strong means of engaging the nipple. On the outer sides of the legs 18 and 19 are two pins 18a and 19a which fit in the respective forked ends of the yoke lever 13. This arrangement allows the operator to press downwardly on the handle 12 and force the nipple over the neck of the glass body. The lug 12a on the handle strikes a stop 23 which determines the position of the nipple 14 on the neck a.

No connections from the nipple 14 to particular exhausting means are shown. It being sufficient to say that the interior of the nipple is in communication with exhausting means, such as are commonly used in the art. Similarly, well known valved connections may be made from a gas charging source such as are used in exhausting and filling electric light bulbs with nitrogen.

As has been said herein, the operator stands to the right of the machine in Fig. I and a glass blank A is clamped in place. Next, the handle 12 is pressed downwardly, which action passes the nipple 14 over the neck a of the glass blank. This is readily done as the upper table portion 1b and the mechanism supported thereon slowly is rotated past him. The interior of the blank is exhausted, and filled with another gas if desired, while the table rotates through three quarters of a revolution. That is, the blank A is placed in the machine at position C and exhausted during the rotation of the table to the position D. As position D is reached the neck a is heated at a point adjacent its jointure with the body portion of the glass blank A. Gas flames may be fed from the nozzles 24 to do the heating in such a manner that the glass of the neck a is at its fusion temperature when the blank A has reached its aforesaid position D.

At the latter position the sealing off linkage comes into play. As may be best seen in Fig. XII the movement of the sealing off dies is guided by a four link chain of arms. There are two upper links 25 and 26, and they are mutually pivoted at one end to a sliding head 27 which slides in an appropriate groove in the standard 4. The other ends of the links 25 and 26 are freely mounted on the shafts 28 and 29 respectively. To the said shafts 28 and 29 are fixed, not free to rotate thereon, two links 30 and 31 which are converged to the shaft 32. The latter shaft is suitably mounted in bosses on the base 2 to be rotatable therein. The link 30 is free and the link 31 is fixed on the said shaft 32. Another arm 33 is also fixed to the shaft 32 and extends downwardly through the bed portion 1b of the machine. Arranged on the shafts 28 and 29 and fixed thereto by means of set screws 34 are the two sealing off dies 35 and 36. It should be noted that the upper glass contacting faces 37 and 38 of the dies 35 are so contoured that they conform to the section of the periphery of the double walled blank A.

The normal position of the dies and their operating linkage is shown in dotted lines and it is in this position that they remain until the table 1b moves into the position D. At this position the glass is ready for sealing, and the tripping arm 39, extending through the table portion 1b, strikes the boss 40 on the lower bed portion 1a. This rotates the tripping cam 41 which raises the sliding head out of the position shown in dotted lines.

It may be seen in the detail of Fig. XII that in the normal position, shown by dotted lines, there is arranged a compressed spring 44 to constantly exert a force tending to raise the shaft 28. When the arms 25 and 26 are raised by the cam 41 slightly beyond their horizontal position the spring then shoots the linkage to its sealing position, shown in full lines. The sealing off dies are shown as they close to close off the neck at the periphery of the blank A. In order that the action of the spring is not too violent, there is a dash pot arrangement 42 connected between the base 2 and the shaft 29, and this serves to restrain the movement of the dies. After the dies have closed the suction in the nipple and the weight thereof separate the neck and pull it from beneath the dies. As the nipple falls back to its inoperative position, the suction from the exhausting means may be automatically shut off.

After the dies have closed off the neck $a$ of the glass blank A the spring tip 33a of lever 33 strikes the roller 43 mounted on the base portion 1a. Since the lever 33 and the link 31 are both fixed to the shaft 32, the rotation of the table portion 1b causes the linkage as a whole to be returned to its normal position. The lever end 33a rests against the roller 43 until the linkage is returned to its dotted line or normal position, then the end 33a passes over the said roller. By this time the sealed off blank A has reached its original position where the operator removes it and the severed neck $a$ from the machine. A new glass blank may then be clamped in the machine to go through a cycle similar to the one described.

The machine is shown with four operating elements and each function as the one described in particular. This means that for every revolution of the table there are four blanks exhausted and sealed off. The finished product or double walled window pane is shown in the Figures IX, X and XI. It should be noted that the two walls of the pane A meet at a periphery which is substantially V shaped in cross section. This particular cross section was designed to facilitate blowing these objects in automatic glass blowing machines. Furthermore, the aforesaid cross section permits the sealing off dies to remove the neck $a$ of the object in such a manner that the glass adjacent the point of severage may be given a shape which conforms to the remainder of the periphery.

Figure XIII shows a side elevation of the modified vice arrangement which holds the glass object in the machine. Instead of an eccentrical shoe 10, however, there is slidably mounted on the pin 45 a wedge member 46. It is thought that the wedge member 45 would give a greater and more rigid contact between the glass object and the clamping means as a whole.

What I claim is:

1. In a machine for exhausting and sealing off hollow glass objects having a hollow neck thereon, the combination of a nipple connected to an exhaust line, means for raising the nipple to engage the neck on the glass object, means for heating the neck adjacent the said object to its fusion temperature, a mechanical linkage carrying sealing off dies, said dies being shaped to conform to the cross section of the periphery of the glass object, and means for automatically operating said linkage to cause the dies to seal off the aforesaid neck.

2. An article of manufacture comprising an integral, blown glass windowpane which is substantially exhausted of air and hermetically sealed throughout, said windowpane comprising two walls, both of which in cross-section curve inwardly toward and terminate in a peripheral edge portion, whereby said walls are each self-supporting throughout their extent, said peripheral edge portion comprising two narrow surfaces which converge substantially to a line.

3. A windowpane blank comprising a hollow, blown glass body which is rectangular in side elevation, said body comprising two opposed convex walls which terminate at their edges in a peripheral edged portion, and a hollow neck integral with said edge portion and affording communication with the interior of said body, said edge portion comprising two narrow surfaces which converge substantially to a line.

4. A means to connect the neck of a hollow glass object to an exhaust line comprising a hollow rubber body which is open at the top for the reception of the neck of such glass object, and open at the bottom for communication with an exhaust device, said body having a flange integral with and extending laterally from said rubber body, a metal plate on each of the opposed faces of said flange for reinforcing the same, and means engaging said plate-protected flange for raising and lowering said rubber body.

5. A means to connect the neck of a hollow glass object to an exhaust line comprising a hollow rubber nipple which is open at the top for the reception of the neck of such glass object, and open at the bottom for communication with an exhaust device, said nipple having a flange or collar integral with and extending laterally from said nipple, a metal plate secured to the face of said flange for reinforcing the same, a supporting frame vertically slidably fixed to the machine base, said flange being fixed to said slideable frame, and means for raising the frame to pass the nipple over the neck of the object.

6. In a mechanism for sealing off glass objects two upper links mutually pivoted at one of their ends, each of the diverging ends of said upper links being freely mounted on a cross shaft, two lower links loosely mounted on the said cross shafts and converging to a fixed shaft, a sealing off die fixed to each of said cross shafts which are normally separated a distance equal to the total length of the said upper links, resilient means tending to force the said cross shafts together, and operative means for releasing the said resilient means to cause the sealing off dies to function.

7. In a die mechanism for sealing off glass objects a four link chain of arms pivotally interconnected, sealing off dies fixed on the horizontally opposed pivotal means of the linkage, said chain of pivoted arms being arranged to normally retain the sealing off dies in a spread or open position, resilient means normally compressed and tending to move the chain of arms to bring the dies together, and tripping means arranged to release the said resilient means to cause the dies to function.

8. In a die mechanism for sealing off glass objects a four link chain of arms interconnected by two horizontally opposed pivots and two vertically opposed pivots, sealing off dies fixed on the horizontally opposed pivots, said dies being normally maintained in a spread or open position, resilient means normally compressed and tending to bring the dies together, tripping means arranged to automatically release said resilient means to bring the dies together, and a retarding device connected to the linkage to prevent the action from being too violent.

9. In a die mechanism for sealing off glass objects a four link chain of arms interconnected by two horizontally opposed pivots and two vertically opposed pivots, sealing off dies fixed on the horizontally opposed pivots, said dies being normally maintained in a spread or open position, resilient means normally compressed and tending to bring the dies together, tripping means arranged to automatically release said resilient means to bring the dies together, a retarding device connected to the linkage to prevent the action of the dies from being too violent, and means for automatically returning the mechanism to its normal position.

10. In die mechanism for sealing-off glass objects including a pair of sealing-off dies carried by die mounting means, said means comprising four links pivotally interconnected in quadrangular formation, together with means to move said links to bring said dies into sealing-off position.

11. In a sealing off apparatus for glass objects two opposed dies normally maintained in a separated position, compressed resilient means exerting a force tending to move said dies into operative position, members arranged to automatically release said resilient means to cause said dies to function, and a retarding device operatively embodied in the apparatus to prevent the action of the compressed resilient means from being too violent.

12. In a sealing off apparatus for glass objects two opposed dies normally maintained in a separated position, compressed resilient means tending to move said dies into operative position, a member arranged to automatically release said resilient means to cause said dies to function, a retarding device operatively embodied in the apparatus to prevent the action of the released resilient means from being too violent, and members for automatically returning the dies to their normal position.

13. In a machine for exhausting and sealing off hollow glass objects having a hollow neck thereon, a nipple connected to an exhaust line, means for raising said nipple to engage the neck of said glass object, means for heating the neck of said object after its exhaustion, two opposed dies, and compressed resilient means for operatively closing said dies to seal off the heated neck from the glass object aforesaid.

14. In a machine for exhausting and sealing off hollow glass objects the combination of means for connecting the interior of said object to exhausting means, means for heating the glass object at the sealing off region, and opposed sealing off dies, said dies having sealing off faces which are formed to give the sealed portion a shape conforming with the remaining object.

15. In a machine for exhausting and sealing off hollow glass objects the combination of an object retaining clamp, exhausting means and connections therefrom to the said glass object, heating elements to fuse the glass in its region of sealing off, opposed sealing off dies, the sealing off faces of said dies being shaped to give the sealed portion a shape conforming with the remainder of the object, means arranged to normally retain the dies in a separated position, operative means for automatically closing said dies to seal off the glass object, and means for returning said dies to their normal position.

In witness whereof, I hereunto set my hand.

JOHN N. SCISM.